United States Patent
Terada et al.

(10) Patent No.: US 10,733,749 B2
(45) Date of Patent: Aug. 4, 2020

(54) VEHICLE VICINITY SUPERVISING DEVICE AND VICINITY SUPERVISING METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Toshihiko Terada, Kariya (JP); Naohide Uchida, Numazu (JP); Hirotake Ishigami, Okazaki (JP); Hiroaki Ito, Toyota (JP)

(73) Assignees: DENSO CORPORATION, Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 7 days.

(21) Appl. No.: 16/136,905

(22) Filed: Sep. 20, 2018

(65) Prior Publication Data
US 2019/0096075 A1 Mar. 28, 2019

(30) Foreign Application Priority Data
Sep. 22, 2017 (JP) .................................. 2017-183036

(51) Int. Cl.
*H04N 7/14* (2006.01)
*G06T 7/593* (2017.01)
*H04N 13/00* (2018.01)
*H04N 7/18* (2006.01)

(52) U.S. Cl.
CPC .... *G06T 7/593* (2017.01); *G06T 2207/10012* (2013.01); *G06T 2207/20221* (2013.01); *G06T 2207/20228* (2013.01); *G06T 2207/30252* (2013.01)

(58) Field of Classification Search
USPC ............ 348/14.16, 42, 47, 48, 61, 118, 120
See application file for complete search history.

(56) References Cited

U.S. PATENT DOCUMENTS

2002/0085000 A1* 7/2002 Sullivan ................ G06T 15/405
345/422
2010/0142924 A1* 6/2010 Yamashita ............. G11B 27/10
386/241

FOREIGN PATENT DOCUMENTS

JP 5280768 B2 9/2013

* cited by examiner

*Primary Examiner* — Daquan Zhao
(74) *Attorney, Agent, or Firm* — Maschoff Brennan

(57) ABSTRACT

An apparatus for supervising a vicinity of a vehicle includes: an image capturing unit that captures a plurality of images in which an object is simultaneously captured from different locations; a parallax calculation unit that performs a sub pixel estimation based on the plurality of images to calculate a parallax value; a parallax offset calculation unit that calculates a parallax offset value based on the parallax value under a condition where a decimal part S of the parallax value is within a predetermined range; and a parallax correction unit that corrects the parallax value using the parallax offset value.

4 Claims, 3 Drawing Sheets

VEHICLE VICINITY SUPERVISING DEVICE AND VICINITY SUPERVISING METHOD

CROSS-REFERENCE TO RELATED APPLICATION

This application is based on and claims the benefit of priority from earlier Japanese Patent Application No. 2017-183036 filed Sep. 22, 2017, the description of which is incorporated herein by reference.

BACKGROUND

Technical Field

The present disclosure relates to a vicinity supervising device and a vicinity supervising method which supervise vicinity of a vehicle, in which parallax value of an object is calculated based on two images captured by two imaging devices so as to supervise vicinity of the vehicle.

Description of Related Art

As a technique for calculating a parallax of an object based on two images captured by two imaging devices such as a stereo camera, for example, Japanese Patent Number 5280768 discloses a stereo matching procedure. The stereo matching procedure calculates a parallax of each pixel by searching correlated pixels between two images having mutually different capturing positions.

In the case where optical axes of the two cameras as the stereo camera are shifted from each other, the parallax calculated from the captured image may have an error (parallax offset). The parallax offset causes an error when the vicinity supervising device detects location or the like of an object. In this respect, for example, as disclosed in the above-mentioned patent literature (JP-5280768), a technique has been disclosed in which a parallax offset is calculated to correct the parallax value by using the calculated parallax offset.

In order to compensate resolution of the stereo image, a technique is known in which a sub pixel estimation is performed to correlate images with sub pixel unit. As a method of sub pixel estimation, it is common where a coincidence evaluation value calculated at each pixel is fitted to a function (fitting), whereby the coincidence evaluation value for each sub pixel is interpolated to estimate the correlation with high resolution.

However, when performing a sub pixel estimation with the above-described method, a systematic estimation error may occur which is referred to as a pixel locking. The error caused by a pixel locking causes an error in the parallax value and the parallax offset so that it is impossible to appropriately correct the parallax using the parallax offset value. As a result, malfunction occurs in the vicinity supervising device so that an alert indication or a command of control system in the vehicle may not be performed.

SUMMARY

The present disclosure is achieved in light of the above-described circumstances and provides an apparatus and a method for supervising a vicinity of a vehicle, capable of appropriately correcting a parallax value by suppressing a calculation error of the parallax offset caused by pixel locking.

The present disclosure provides an apparatus for supervising a vicinity of a vehicle. The apparatus includes: an image capturing unit that captures a plurality of images in which an object is simultaneously captured from different locations; a parallax calculation unit that performs a sub pixel estimation based on the plurality of images to calculate a parallax value; a parallax offset calculation unit that calculates a parallax offset value based on the parallax value under a condition where a decimal part S of the parallax value is within a predetermined range; and a parallax correction unit that corrects the parallax value using the parallax offset value.

According to the apparatus for supervising the vicinity of the vehicle of the present disclosure, the parallax offset calculation unit calculates the parallax offset under a condition where a decimal part S of the parallax value calculated by the parallax calculation unit is within a predetermined range. Hence, the parallax calculation unit performs a sub pixel estimation, whereby the parallax offset value can be calculated considering a fact that pixel locking is likely to occur depending on the decimal part S of the parallax value. As a result, accuracy for correcting the parallax value can be improved.

Moreover, the present disclosure provides a method for supervising vicinity of a vehicle which is achieved by the above-described apparatus for supervising the vicinity of the vehicle. The method includes an image capturing step for capturing a plurality of images in which an object is simultaneously captured from different locations; a parallax calculation step for performing a sub pixel estimation based on the plurality of images to calculate a parallax value; a parallax offset calculation step for calculating a parallax offset value based on the parallax value under a condition where a decimal part S of the parallax value is within a predetermined range; and a parallax correction step for correcting the parallax value using the parallax offset value.

DETAILED DESCRIPTION OF PREFERRED EMBODIMENTS

Figure 1:
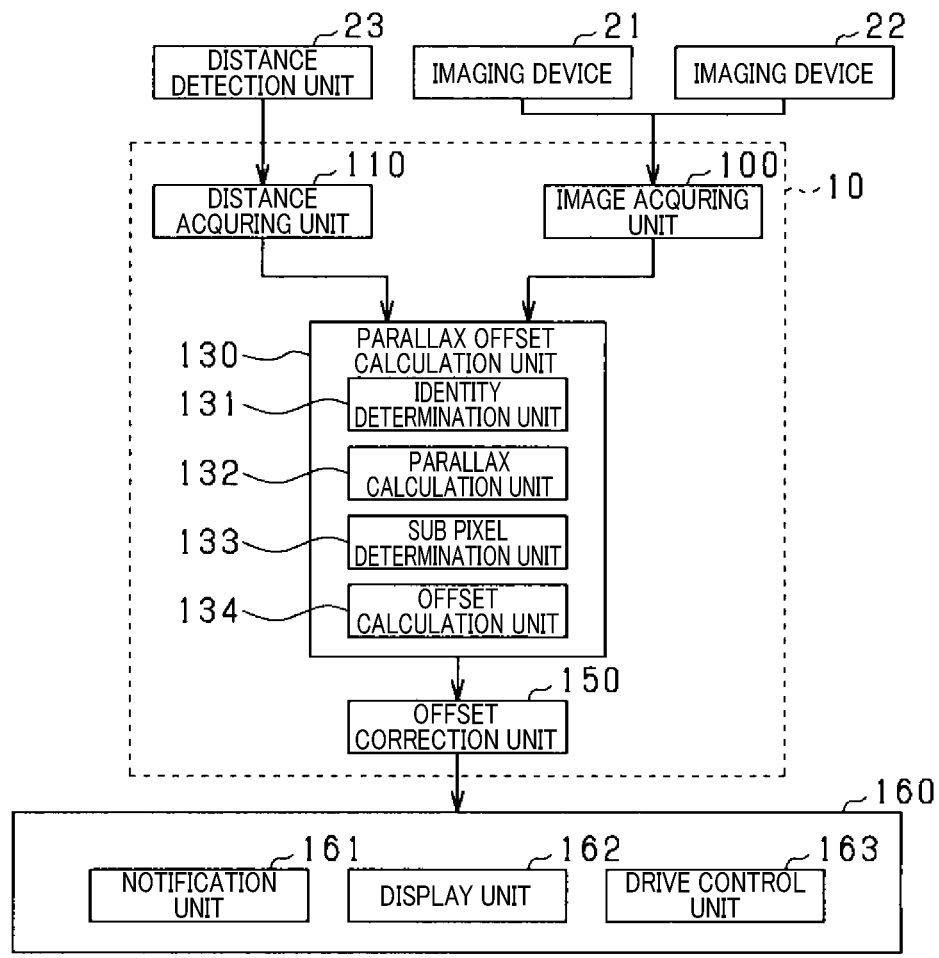
FIG. 1 is a block diagram showing a vicinity supervising device according to an embodiment of the present disclosure.

As shown in FIG. 1, a vicinity supervising device 10 according to the present embodiment includes an image capturing unit 100, a distance acquiring unit 110, a parallax offset calculation unit 130, and a parallax correction unit 150. The vicinity supervising device 10 is configured as an electronic control unit (ECU) including an A/D (analog to digital) converter, I/O, CPU, RAM, ROM, image memory and the like, in which the CPU executes a program stored in advance to accomplish the above-mentioned respective functions. Instead of using the CPU, or together with the CPU, FPGA (field-programmable gate array) where digital circuit is provided therein may be included.

Signals outputted by imaging devices 21 and 22 and a distance detection unit 23 are converted to digital signals and outputted to the CPU of the vicinity supervising device 10. The vicinity supervising device 10 calculates a parallax offset value based on the input signals to correct the image, and outputs image data and a control signal to an external apparatus 160 including a notification unit 161, a display unit 162 and a drive control unit 163.

An image capturing unit 100 acquires images simultaneously captured by a pair of imaging devices 21 and 22. Thus, a plurality of images can be acquired in which an object is simultaneously captured by the pair of imaging devices 21 and 22 at different locations. The imaging devices 21 and 22 are configured as a stereo camera integrating image sensors such as CCD or COMS sensors or infrared camera. The imaging devices 21 and 22 are mounted to a portion behind the rear-view mirror to have a predetermined base line length in the vehicle width direction. The imaging devices 21 and 22 capture a surrounding environment including a road ahead of the own vehicle and a preceding vehicle or the like.

The imaging device 21 outputs a standard image Tc and the imaging device 22 outputs a reference image Tc. The imaging device 21 and the imaging device 22 are synchronized to each other, simultaneously capture the surrounding environment at the same timing and output a pair of analog images To and Tc to the image capturing unit 100.

In the image capturing unit 100, the A/D converter converts the pair of analog images To and Tc received from the imaging devices 21 and 22 into digital images each having a predetermined luminance gradation and outputs them to the parallax offset calculation unit 130.

The distance acquiring unit 120 acquires a distance up to an object measured by the distance detecting unit 23. The distance detection unit 23 may be configured of any apparatus that transmits probing waves and receives the reflected waves from an object. Specifically, for example, a laser radar apparatus that emits electromagnetic waves (radio waves or light waves) ahead of the vehicle and receives their reflection waves, or a sonar radar apparatus that uses acoustic waves such as ultrasonic waves can be employed. According to the present embodiment, a case will be described in which the distance detection unit is a laser radar apparatus as an example.

Figure 2:
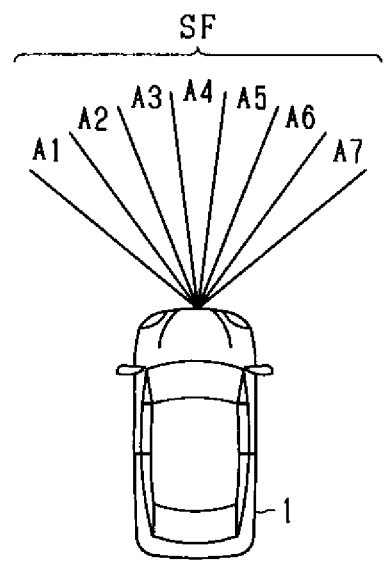
FIG. 2 is an explanatory diagram showing a probing range of a distance detection apparatus.

As shown in FIG. 2, the distance detection unit 23 is attached in the vicinity of a front grille of a vehicle 1. The distance detection unit 23 is provide with a light emitting element such as a laser diode, a collimate lens, a condenser lens, a plurality of light receiving element or the like. Laser light emitted from the light emitting element is radiated towards entire probing range SF by the collimate lens. The incoming reflection light from the probing range SF is received by a plurality of light receiving elements via the condenser lens. As shown in FIG. 2, the plurality of light receiving elements are arranged in the vehicle width direction at a constant interval such that reflected light is received from each of seven divided regions A1 to A7 where the probing range SF is divided at predetermined angle on the horizontal plane. Note that each light receiving range of respective receiving elements in the vertical direction is set to be substantially constant angle range.

The distance detection unit 23 measures intensity of the reflected light reflected at an object existing ahead of the vehicle 1 for each of the divided regions A1 to A7. The distance detection unit 23 outputs the measured reflection intensity of the reflection light and a distance Z between the vehicle 1 and the object that causes the reflection light to the parallax offset calculation unit 130.

The parallax offset calculation unit 130 calculates a parallax offset value based on a plurality of images received from the image capturing unit 100 and a distance up to the object detected by the distance acquiring unit 110. As shown in FIG. 1, the offset calculation unit 130 includes an identity determination unit 131, a parallax calculation unit 132 and an offset calculation unit 134.

Figure 3:
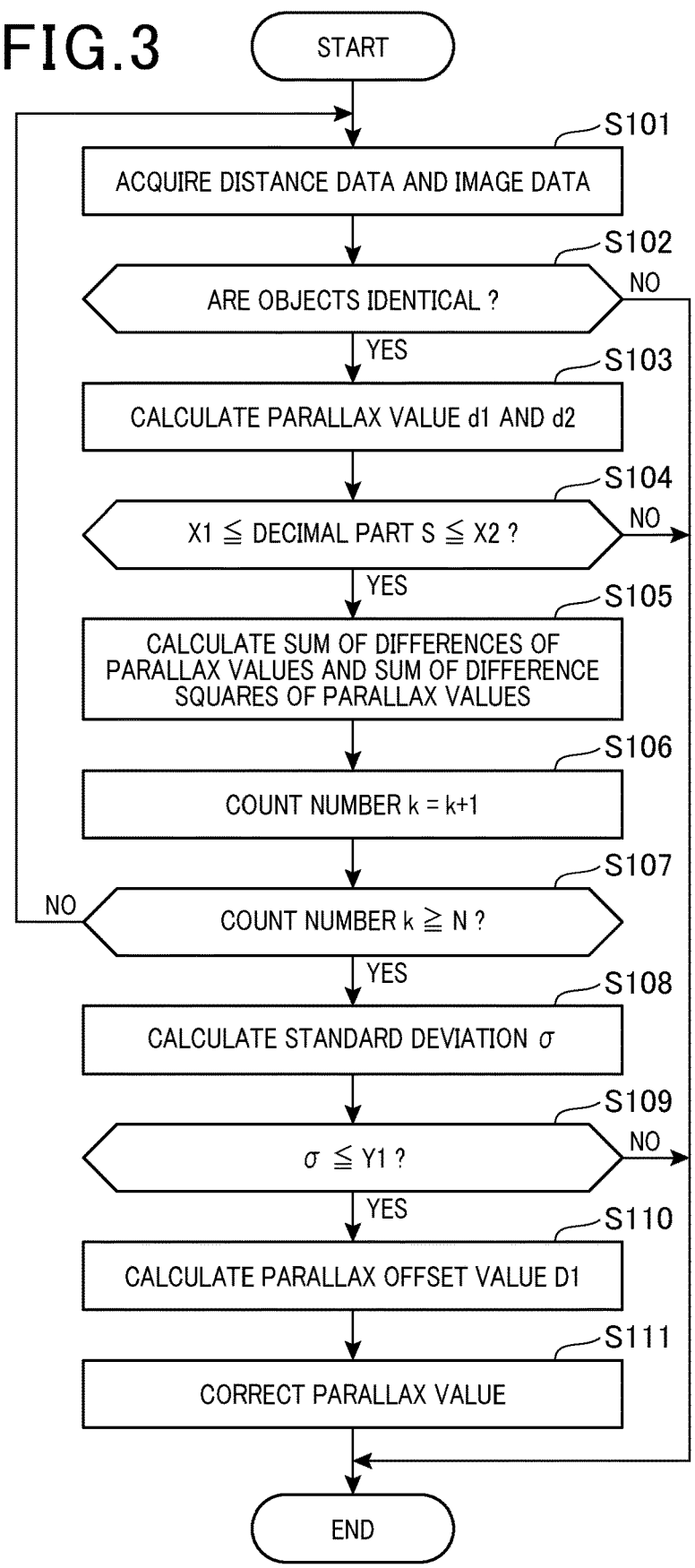
FIG. 3 is a flowchart showing a calculation process of the vicinity supervising device.

In FIG. 3, a flowchart of a calculation process executed by the vicinity supervising device 10 is shown. This flowchart represents a part of a vicinity supervising method performed by the vicinity supervising device 10. The image capturing unit 100 and the distance acquiring unit 110 execute an image acquiring step (step S101) and a distance acquiring step (step S101) respectively, to acquire the image data and the distance data, and outputs them to the parallax offset calculation unit 130. The identity determination unit 131 of the parallax offset calculation unit 130 executes an identity determination step (step S102) to determine whether the object captured in the image of the image capturing unit 100 and the object from which the distance has been acquired by the distance acquiring unit 110 are identical or not. Specifically, the identity determination unit 131 extracts a data region in which only one object is present in the acquired distance range, and determines whether or not only one object is present in a data region of the image corresponding to the extracted data region, then the identity determination unit 131 determines objects in the both data regions are identical when the only one object is present in a data region of the image corresponding to the extracted data region. When the identification determination unit 131 determines that objects in both data regions are not identical objects, the calculation process of the parallax offset calculation unit 130 is terminated. In other words, the parallax offset calculation unit 130 calculates a parallax offset value D under a condition where the object captured in the image of the image capturing unit 100 and the object from which the distance has been acquired by the distance acquiring unit 110 are determined as identical.

The parallax calculation unit 132 executes a parallax calculation step (S103) to calculate a parallax value d1 and a parallax value d2 for the object determined as identical by the identity determination unit 131. The parallax value d1 is based on digital image acquired by the image capturing unit 100, and the parallax value d2 is based on the distance acquired by the distance acquiring unit 110.

The parallax calculation unit 132 performs a sub pixel estimation when performing a stereo matching process for a pair of digital images. Thus, the parallax value d1 is calculated with a sub pixel accuracy. As a sub pixel estimation, for example, an equiangular linear fitting method, a parabola fitting method, or fitting using a high-order polynomial can be employed.

The parallax calculation unit 132 divides the standard image To and the reference image Tc into a predetermined pixel regions. Then, the parallax calculation unit 132 sets, for each pixel region PBo in the standard image To, an epipolar line EPL corresponding to the pixel region PBo in the reference image Tc, and compares a luminance pattern of the pixel region PBo with a luminance pattern of a pixel region PBc existing on the epipolar line EPL in the reference image Tc. For a comparison between the pixel region PBo and the pixel region PBc, an evaluation function such as SAD (sum of absolute difference) or SSD (sun of squared difference) can be used. For a matching method, any methods can be used. However, SGM (semi-global matching) method is preferably used.

Figure 4:
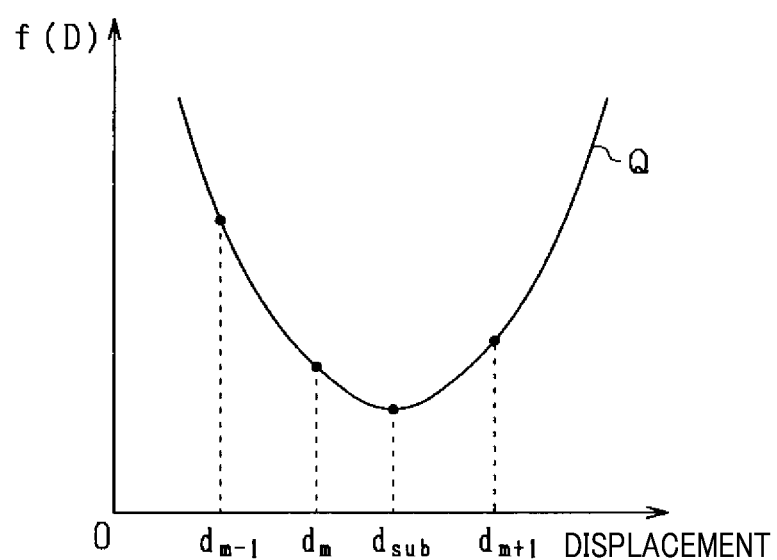
FIG. 4 is a graph that illustrates a sub pixel estimation.

The parallax calculation unit 132 calculates a displacement dm in which the evaluation function f (d) becomes minimum, and performs a sub pixel estimation to calculate the parallax value d1 in sub-pixel units. A method for estimating sub pixel will be described with a parabola fitting, for example. The parallax calculating unit 132 calculates a displacement dm (integer number) in which the evaluation function f (d) becomes minimum, and further calculates displacements dm−1 and dm+1 which correspond to adjacent one pixel. Then, as shown in FIG. 4, the displacements dm−1, dm, dm+1 are fitted to a parabola curve Q and a sub pixel estimation value dsub which is a displacement of the apex of the parabola curve Q is calculated. The parallax calculation unit 132 calculates the sub pixel estimation value dsub as the parallax value d1 and outputs the sub pixel estimation value to a sub pixel determination unit 133.

Also, the parallax calculation unit 132 calculates the parallax value d2 based on the distance acquired by the distance acquiring unit 110. The parallax value d2 can be calculated with the following equation (1). In the following equation (1), B refers to a base line length of the imaging devices 21 and 22, F refers to a focus distance of the imaging devices 21 and 22, Z refers to a distance between the vehicle 1 and the object which is outputted by the distance acquiring unit 120, and Oc refers to a distance between the vehicle 1 and the imaging devices 21 and 22. The parallax calculation unit 132 outputs the calculated parallax d2 to the offset calculation unit 134.

$$d2 = \frac{BF}{Z+Oc} \quad (1)$$

The sub pixel determination unit 133 executes a determination step (step S104) that determines whether the decimal part S of the parallax value d1 satisfies X1≤S≤X2. The threshold X1 and X2 is a positive fractional value which is less than 1, and satisfies a condition 0<X1≤X2<1. The threshold values X1 and X2 is preferably set within a predetermined range excluding vicinity of integer number. Specifically, the threshold values X1 and X2 are preferably set to be a value capable of determining a value S within a numerical range including a range around S=0.5 where the pixel locking error becomes minimum. For example, the threshold values are more preferably set to be a range 0<X1≤0.5, 0.5≤X2<1. More specifically, for example, the threshold values are set such that X1=0.25, and X2=0.75, whereby S value can be set within a numerical range including a region around S=0.5. In the case where the condition at step S104 is satisfied, the sub pixel determination unit 133 outputs the parallax value d1 to the offset calculation unit 134. When the condition at step S104 is not satisfied, the subpixel determination unit 133 terminates the procedure without outputting the parallax value d1 to the offset calculation unit 134.

The offset calculation unit 134 executes a parallax offset calculation step (step S105 to step S110) to calculate a sum of differences between the parallax value d1 and the parallax value d2, and a sum of difference squares thereof, based on the following equations (2) and (3). Note that k value shown in the following equations (2) and (3) refers to a count value representing the number of data which are summed in calculations of the sum of differences and the sum of difference squares. The offset calculation unit 134 continues to acquire the parallax value d1 and the parallax value d2 until the number of counts k reaches N, that is, k=N. In other words, the count value k is incremented (step S106), and it is determined whether the count value k satisfies a condition k≥N (step S107), and the process returns so step S101 when a condition k<N is satisfied.

$$\Sigma_k^N(d1-d2) \quad (2)$$

$$\Sigma_k^N(d1-d2)^2 \quad (3)$$

When the count value k satisfies k≥N at step S107, the offset calculation unit 134 calculates a standard deviation σ of the parallax difference d1−d2. The standard deviation σ equals the square root of the above-described equation (3). The offset calculation unit 134 determines whether the standard deviation σ is the threshold Y1 or less (step S108). When the standard deviation is σ≤Y1, the offset calculation unit 134 calculates the parallax offset value D based on the following equation (4) (step S110), and outputs the calculated value to the parallax correction unit 150. The parallax correction unit 150 executes a parallax correction step (step S111) to correct the parallax value d1 using the parallax offset value D. When the determination result of the standard deviation is σ<Y1, the offset calculation unit 134 terminates the calculation process shown in FIG. 3 without calculating the parallax offset value D.

$$D = \frac{\sum_{k}^{N}(d1-d2)}{N} \quad (4)$$

According to the above-described embodiments, the following effects and advantages can be obtained.

The parallax offset calculation unit 130 is provided with the sub pixel determination unit 133 that calculates a parallax offset value D based on the parallax value d1 under a condition where the decimal part S of the parallax value d1 is within a predetermined range. Hence, calculation error of the parallax offset caused by the pixel locking is suppressed so that the parallax value can be appropriately corrected. Since the threshold values X1 and X2 are preferably set within a predetermined range excluding vicinity of integer number, the parallax offset value can be calculated without using a parallax value in the vicinity of integer number which causes pixel locking.

The sub pixel determination unit 133 enables a calculation of the parallax offset value D under a condition where 0.255≤S≤0.75 is satisfied. Hence, S value can be determined within a numerical range including a region around S=0.5 where pixel locking error determining S value becomes minimum so that calculation error of the parallax offset value caused by pixel locking can be effectively suppressed.

The parallax offset calculation unit 130 excludes a parallax value that causes pixel locking before calculating the parallax offset value D so that an amount of accurate data of parallax value may be decreased. In the case where a conventional technique is employed where parallax value which causes pixel locking is not excluded, large number of data of the parallax value has to be acquired and averaged to reduce an influence of pixel locking. Accordingly, a large amount of parallax value data is required so that calculation time may increase.

As shown in steps S105 to S109, the parallax offset calculation unit 130 stores N number of difference data between the parallax value d1 and the parallax value d2 and evaluates the standard deviation σ to calculate the parallax offset value D. Accordingly, a more accurate parallax offset value can be calculated.

The vicinity supervising device 10 uses the parallax offset value D1 calculated based on the distance Z which is measured using the probing waves, to correct parallax. Hence, the parallax can be corrected accurately.

The vicinity supervising device 10 includes the identity determination unit 131 which determines whether an object captured in a plurality of images and an object from which the distance has been acquired are identical or not. When the identity determination unit 131 determines that the objects are identical, the parallax offset calculation unit 130 calculates a parallax offset value D1. The identity determination unit 131 performs the above-described determination, whereby the reliability of the parallax offset value D can be improved.

Note that a vicinity supervising device is exemplified in the above-described embodiments, excluding a distance detection apparatus, a measuring apparatus such as imaging device, a notification unit, a display unit, a driving control apparatus or the like. However, the vicinity supervising device may include the above-mentioned apparatuses, or may be integrated to the vicinity supervising device.

What is claimed is:

1. An apparatus for supervising vicinity of a vehicle comprising:
   an image capturing unit that captures a plurality of images in which an object is simultaneously captured from different locations;
   a parallax calculation unit that performs a sub pixel estimation based on the plurality of images to calculate a parallax value;
   a parallax offset calculation unit that calculates a parallax offset value based on the parallax value under a condition where a decimal part S of the parallax value is within a predetermined range;
   a parallax correction unit that:
      corrects the parallax value using the parallax offset value,
      corrects the plurality of images using the corrected parallax value to generate a plurality of corrected images, and
      outputs the plurality of corrected images to an external apparatus.

2. The apparatus according to claim 1, wherein
   the parallax offset calculation unit is configured to calculate the parallax offset value based on the parallax value under a condition where the decimal part S is within a predetermined range expressed by an equation (1) using a threshold value X1 and a threshold value X2 as below;

$X1 \leq S \leq X2$ $0 < X1 \leq X2 < 1$ (1).

3. The apparatus according to claim 1, wherein
   the parallax offset calculation unit is configured to calculate, for N parallax values where the decimal part S of each parallax value calculated by the parallax calculation unit satisfies the equation (1), a sum of differences of the parallax values and a sum of difference squares of the parallax values, and calculate a value where the sum of the differences of the parallax values is divided by N to be the parallax offset value, when the sum of difference squares of the parallax values is a threshold value or less.

4. A method for supervising vicinity of a vehicle comprising:
   an image capturing step for capturing a plurality of images in which an object is simultaneously captured from different locations;
   a parallax calculation step for performing a sub pixel estimation based on the plurality of images to calculate a parallax value;
   a parallax offset calculation step for calculating a parallax offset value based on the parallax value under a condition where a decimal part S of the parallax value is within a predetermined range;
   a parallax correction step for correcting the parallax value using the parallax offset value; and
   a parallax correction step for correcting the plurality of images using the corrected parallax value to generate a plurality of corrected images and outputting the plurality of corrected images to an external apparatus.

* * * * *